United States Patent
Heijnen et al.

Patent Number: 5,855,785
Date of Patent: Jan. 5, 1999

[54] THREE-PHASE SEPARATOR FOR A FLUIDIZED BED APPARATUS

[75] Inventors: Joseph Johannes Heijnen, Rijen; Wilhelmus Antonius Adrianus Koevoets, Sint-Willebrord; Robert Jan Zoetemeyer, Montfoort, all of Netherlands

[73] Assignee: Biothane Corporation, Camden, N.J.

[21] Appl. No.: 89,944

[22] Filed: Jul. 9, 1993

Related U.S. Application Data

[62] Division of Ser. No. 581,135, Sep. 10, 1990, Pat. No. 5,230,794, which is a continuation of Ser. No. 254,053, Oct. 6, 1988, abandoned.

[30] Foreign Application Priority Data

Oct. 8, 1987 [EP] European Pat. Off. ............ 87201931

[51] Int. Cl.$^6$ ................................................. B01D 21/00
[52] U.S. Cl. ............................................................ 210/522
[58] Field of Search ...................... 210/521, 522

[56] References Cited

U.S. PATENT DOCUMENTS

| | | | |
|---|---|---|---|
| 4,477,344 | 10/1984 | Olszewski et al. | 210/521 |
| 4,482,458 | 11/1984 | Rovel et al. | 210/603 |
| 4,532,042 | 7/1985 | Aivasidis et al. | 210/603 |
| 4,609,460 | 9/1986 | Vellinga | 210/188 |
| 4,620,931 | 11/1986 | Hirata et al. | 210/617 |
| 4,664,802 | 5/1987 | Lee | 210/522 |
| 4,746,433 | 5/1988 | Nobl et al. | 210/603 |

FOREIGN PATENT DOCUMENTS

| | | |
|---|---|---|
| 0090450 | 10/1983 | European Pat. Off. |
| 0175568 | 3/1986 | European Pat. Off. |

*Primary Examiner*—Thomas G. Wyse
*Attorney, Agent, or Firm*—Panitch Schwarze Jacobs & Nadel, P.C.

[57] ABSTRACT

The invention relates to a three phase separator which comprises a compartment for the substantial separation of the gas-phase, this compartment being equipped with at least one partition which is applied for an internal gaslift circulation.

2 Claims, 9 Drawing Sheets

PRIOR ART

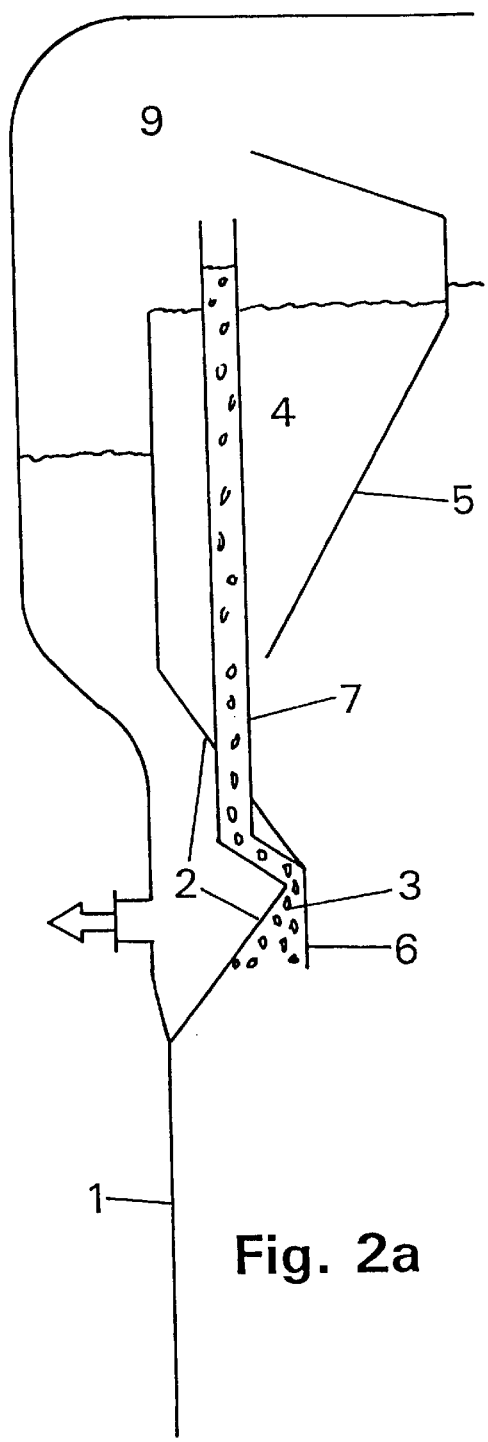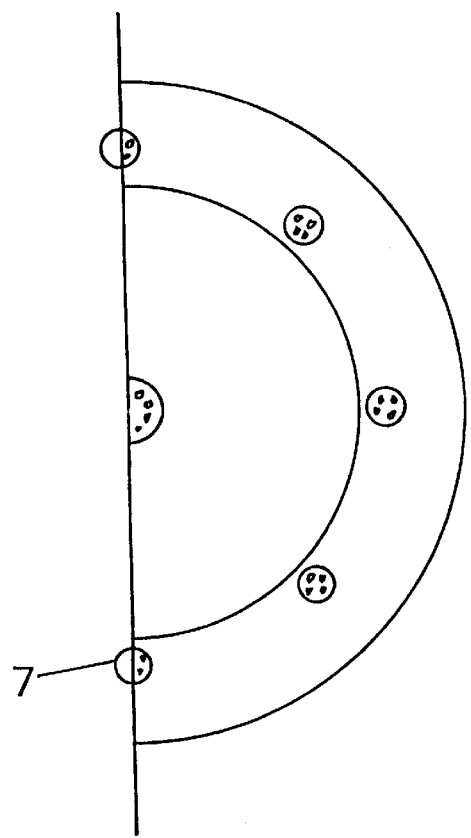
Fig. 2a
Fig. 2b

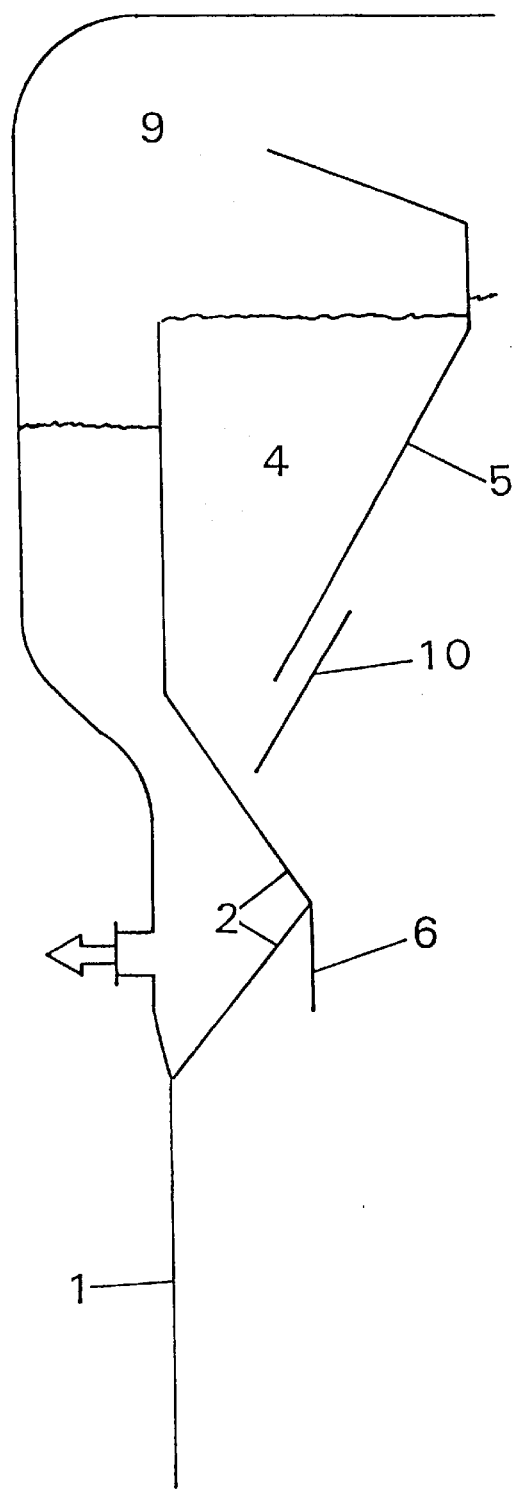

THREE-PHASE SEPARATOR FOR A FLUIDIZED BED APPARATUS

CROSS-REFERENCE TO RELATED APPLICATIONS

This application is a division of application Ser. No. 07/581,135, filed Sep. 10, 1990, now U.S. Pat. No. 5,230,794, which is a continuation of application Ser. No. 07/254,053, filed Oct. 6, 1988, now abandoned.

The invention relates to anaerobic waste water purification using an improved fluidized-bed process and apparatus. Since the early seventies anaerobic treatment of industrial waste-water has gained considerably in importance resulting in the development of improved reactors with high biomass concentration. Compared to other high rate anaerobic reactors (filter reactors, UASB reactors as major available representatives), the fluidized bed system has the main potential advantages of higher purification capacity, no clogging in the reactor (as in filters), no problem of sludge retention (as in UASB system if granular sludge is not obtained) and small volume and area requirements. The relatively high upward liquid velocity prevents clogging and moreover guarantees a good contact between influent and the biomass attached to the carrier. The vertical construction and the relatively small size of the fluidized bed reactors makes a totally closed construction possible preventing emission of malodeurs. Optionally the use of (expensive) corrosion resistant materials is possible.

However, also disadvantages of anaerobic fluidized bed reactors are known which are related to biolayer growth and subsequent control thereof. At the bottom of the reactors often only bare carrier particles are present, which implies that part of the reactor has no purification activity. Operational problems e.g. concerning the relatively long start-up times are caused by starting up with bare carrier particles, which may need a period of 2–4 months to become overgrown.

For example, in the methanogenic phase, under full scale conditions after inoculation with suitable biomass the growing phase will take between 4 and 12 weeks. In this period of time the stability of the system is very sensible to, for example, peak loads. If the specific load is expressed as kg COD/kg VSS/day, then the load on the still small amounts of biomass in the reactor will be too large, this may result in considerable losses of biomass. A short-duration incident may result in an almost complete new start-up of the system. Moreover, in connection with a preferred short residence time (see for example European Patent Application EP-A-28846) during the start-up a pH control may be necessary. Another source of inconvenience is that during standstill of the reactor the liquid distributor may clog due to the settled carrier material at the bottom of the reactor.

Another type of anaerobic process, the UASB-systems (Upflow Anaerobic Sludge Bed) is described in U.S. Pat. No. 4,253,956. Such a process is well-known and often used in practice. On full scale a short and reproducible start up is possible, when sufficient granular sludge is added before the starting up period under exactly predescribed conditions. The granular sludge may be obtained from other UASB-systems. This type of granular sludge consists of granules of active material, which are formed by nature in the UASB-reactor. These granules remain active for years, may be removed from the reactor and may be stored, which makes these granules very suited for use as inoculation material for new plants, or for the re-starting of existing plants after incidents. The UASB-system is also very suited for seasonal plants (for example beet-sugar mills), in which the process is interrupted for months while a fast re-starting up is essential.

However the UASB-reactors have some disadvantages as well, for example, the liquid velocity (1–2 m/h) is insufficient to prevent the (partial) sedimentation of inert sediments in the reactor. To prevent this in several cases the waste water has to be treated first in a primary settler to separate this inert sediment. The UASR-reactors are rather sensible to air-inlet in the upper part, due to their construction, which may result in corrosion. Sometimes the emission of bad-smelling gases may take place due to their escape from the upper part. The overpressure on the upper part must be kept low which makes the transport of the corrosive biogas generally impossible without a compressor. Further the area needed for the implementation of the apparatus, certainly when a primary settler is needed, is rather large and not always available close by the waste-water source.

For low strength waste waters a modified UASB reactor has been designed, the so-called EGSB (Expanded Granular Sludge Bed) reactor (see G. Lettinga and L. H. Pol, Wat. Sci. Tech. vol. 18, no. 12 (1986) pp. 99–108).

When low strength waste water is fed to a UASB reactor the gas production will be too low, the mixing due to this gas formed inside this reactor is insufficient, and the reactor does not function properly.

In order to overcome this problem a significantly higher upward liquid velocity is applied in the EGSB system, which results in a distinct sludge bed expansion and consequently in a better sludge water contact and therefore a better biomass use. Commonly these higher upward velocities are obtained by recirculation of the effluent.

However, the EGSB-concept is only suitable for treating relatively cold and very low strength waste water. When high strength waste water is fed to an EGSB-system the large amounts of gas formed in the reactor will disturb the purification process. Part of the sludge particles will then be washed out of the reactor together with the suspended solids of the influent. In a conventional settler design these removed sludge particles are difficult to separate from the suspended solids, resulting in a loss of active biomass. Therefore an EGSB reactor will not function under conditions of a high strength waste water supply and therefore normal UASB reactors are preferred under these conditions. In this article of G. Lettinga and L. H. Pol no sludge growth is mentioned.

It is an object of the invention to provide a process in which the advantages of the fluidized-bed process and the UASB-process into an improved fluidized-bed process are combined and results in an improved fluidized-bed process.

It is a further object of the invention to provide an improved fluidized-bed process which may be carried out in an improved apparatus which is very suitable for such kinds of process. In this apparatus not only the process of the present invention may be performed, but other fluidized-bed processes (using a carrier material) may be advantageously carried out as well.

BRIEF DESCRIPTION OF THE DRAWINGS

FIGS. 2–4 schematically represent embodiments of the invention and the horizontal cross-sections thereof illustrating the collection of part of the biogas, formed in the reactor.

FIG. 5 schematically shows the use of two parallel plates in the three-phase separator.

Figure 1:
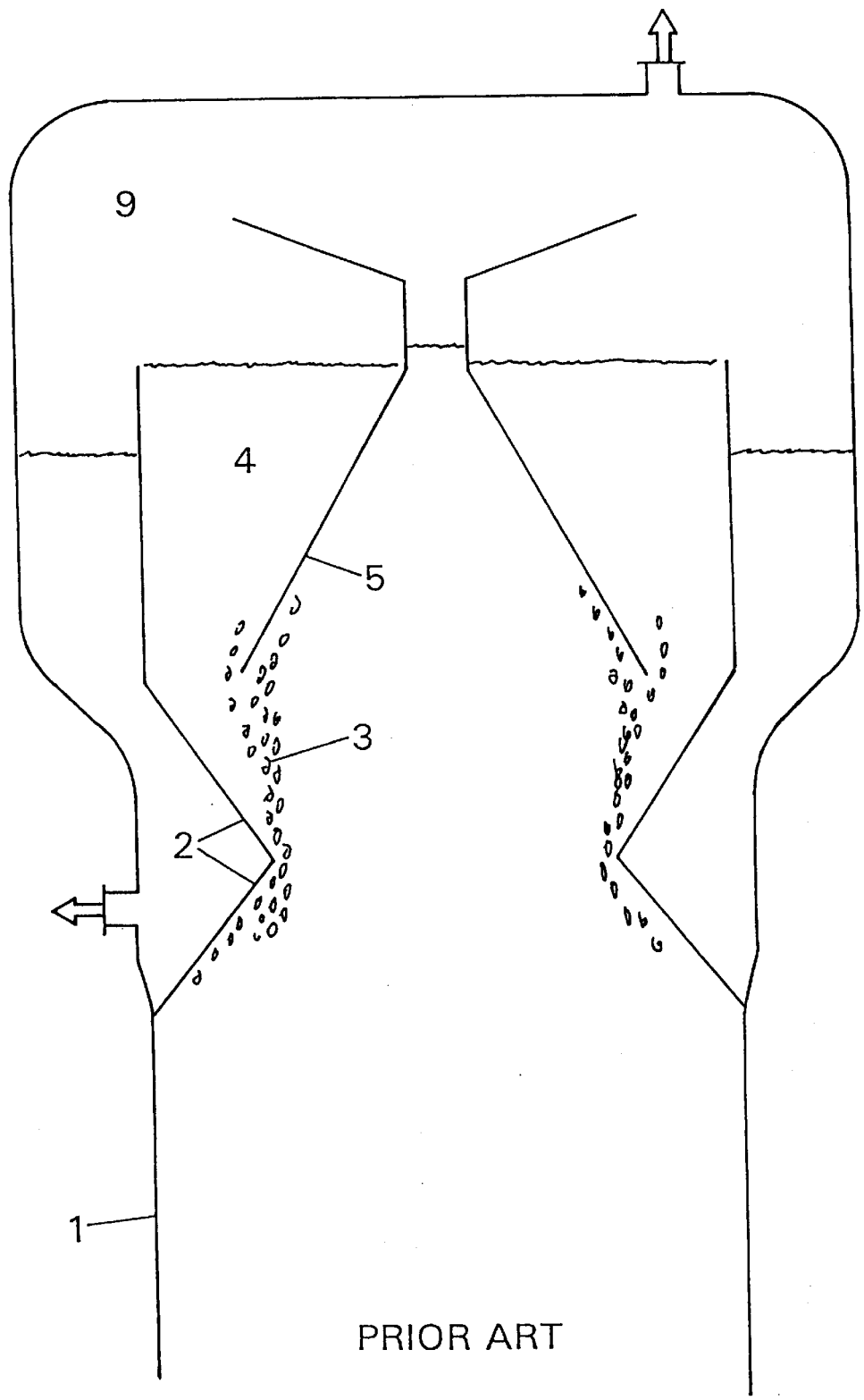
FIG. 1 schematically shows the three phase separator as disclosed in European patent application EP-A90450.
Figure 3A:
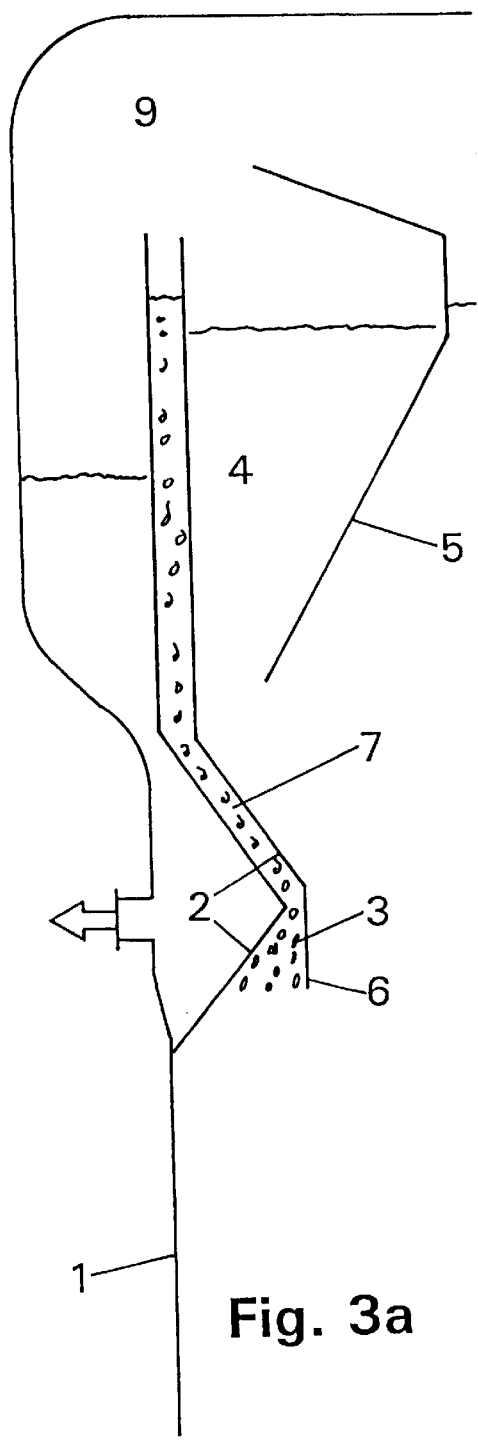
Figure 3B:
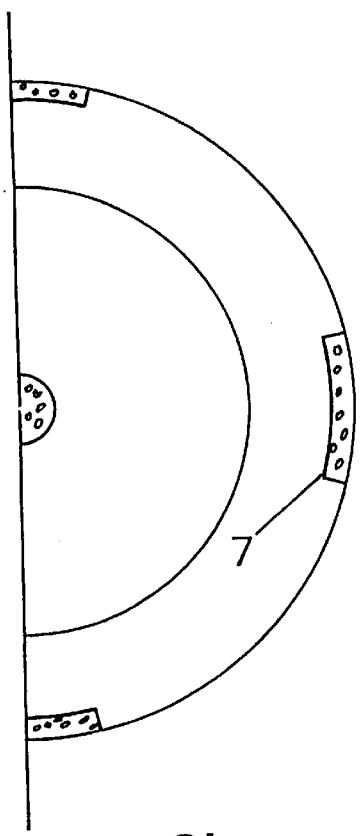
Figure 4A:
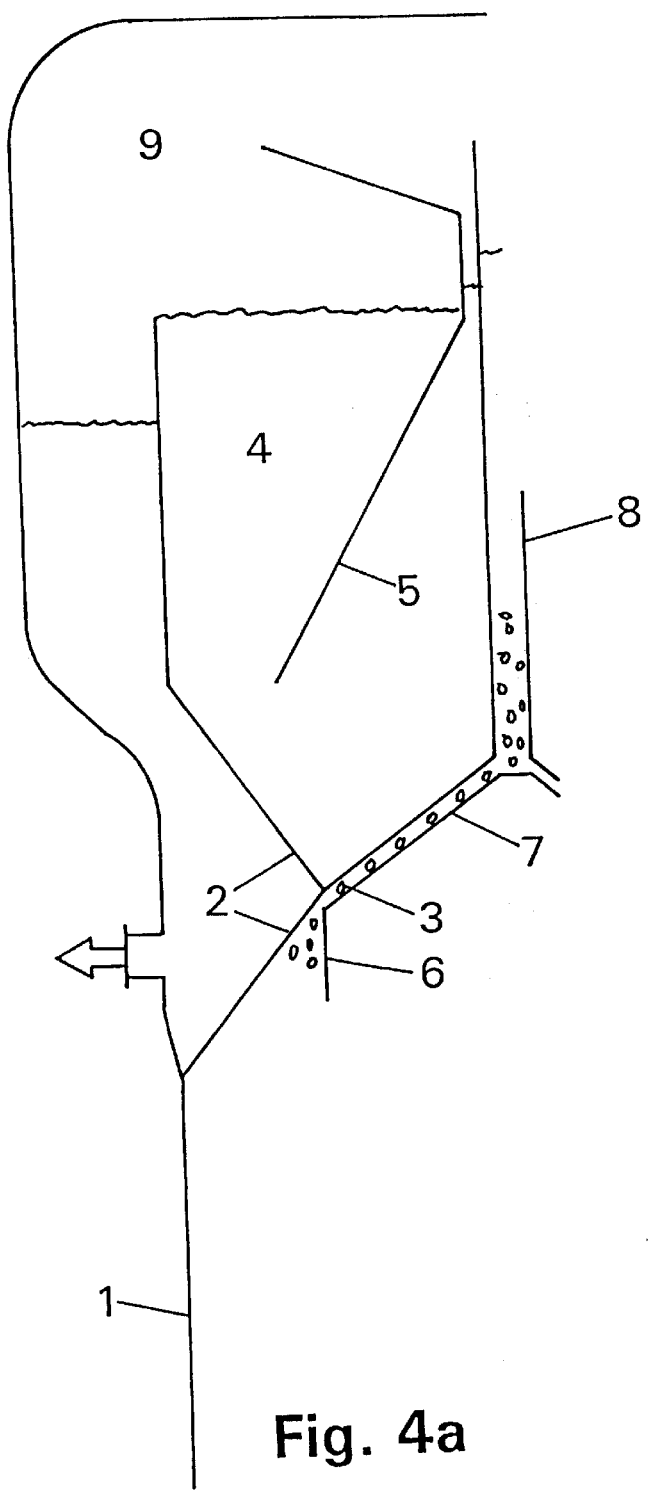
Figure 4B:
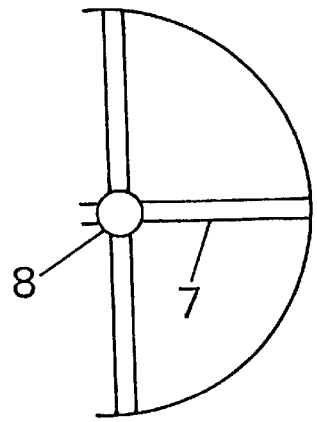

UASB-reactors commonly have a liquid residence time of 4–20 hours. Granular sludge in UASB-reactors is exposed to superficial liquid velocities of 1–2 m/h and to superficial gas velocities (at the upper part of the reactor) of 1–2 m/h. Surprisingly it has been found that this type of granular bed process with liquid residence times of 0,5–4 h, superficial liquid velocities of even 4–25 m/h, preferably 620 m/h and superficial gas velocities of even 4–15 m/h without being damaged.

After extensive research and experimentation it has surprisingly been found that granular sludge not only keeps its granular structure and biological activity after being properly introduced into the fluidized-bed reactor, the granular sludge accommodates to the much more turbulent fluidized-bed conditions as well. Even the amount of granular sludge in the reactor increases in time. This phenomenon is found in acidification as well as in methane formation reactors. This improved fluidized bed process has the benefits of the fluidized bed process as well as of the UASB process, but does not possess the disadvantages of the processes in question. The results of the improved process from laboratory scale, pilot plant scale and full scale installations clearly show the benefits of this invention, not only during the starting-up period, but also under steady-state conditions.

The benefits of the process of the present invention over the EGSB process can be found by comparing the present process with the EGSB process as described by A. W. A. de Man et al. (Proc. 5th Int. Symp. on Anaerobic Digestion, Bologna, Italy, 22–26 May, 1988, p. 197 ff.), which only became public after the priority date of the present invention.

As described hereinbefore the EGSB is not suitable for high strength waste waters. The high superficial velocity in the reactor is obtained by a high recirculation of the effluent. The capacity of the reactor in consequence thereof is low. Low strength waste waters result in low gas production in the reactor, and therefore relatively gentle conditions in relation to turbulence are present.

The insight that the loss of active sludge particles has to be prevented in processes with high gas and liquid velocities, not by choosing gentle conditions inside the (EGSB) reactor, but by choosing an efficient and selective return of the sludge particles to the reactor, forms the basis of the present invention.

Such a return of the sludge particles can be obtained using different separation techniques, e.g. settlers placed on top of the reactor or settlers situated elsewhere. By choosing the proper conditions in such a separator, sludge particles are separated from the effluent containing suspended solids. In this way it becomes possible to purify waste waters which are totally unsuitable for EGSB processes.

In Table 1 some of the typical characteristics of the EGSB and the present process (UFB) are compared in order to show the benefits of the present invention.

TABLE 1

| | EGSB | UFB (present process) |
|---|---|---|
| Height of the reactor (m) | 5–10 | 10–25 |
| Gas production due to converted COD ($m^3$ gas/$m^2$ reactor cross section.d) | >1 | 1.5–15 |
| COD load (kg COD/$m^3$ reactor.d) | 1–5 | 10–80 |
| Recirculation ratio* | 5–10 | 0–4 |
| Superficial liquid velocity (m/h) | 6–8 | 5–20 |

*recirculation ratio = ratio between recirculated effluent of the reactor and the influent of the reactor.

The starting up of the process of the invention can be accelerated by introducing sludge from, for example, a UASB reactor or sludge from another reactor wherein the process according to the invention is carried out. Starting up without inoculation of a substantial amount of sludge is possible, however it will take considerable time before a sufficient amount of granular sludge is present. An already operational fluidized bed process using carrier material may be converted into the present process by choosing the right operational conditions. In this way it becomes possible to switch gradually from the conventional process to the present process. In an embodiment of the invention granular sludge as well as sludge on carrier is present. This embodiment can be advantageously applied in already existing apparatus.

The granules of the present fluidized process are able to withstand the high turbulent conditions in the reactors. They show also other excellent qualities, the granules remain active for years and may be used for the starting up of other fluidized processes. Moreover they may be advantageously applied in the purification of waste waters of seasonal plants.

The terminal falling velocity of the sludge granules (which is a measure for the settlement properties) is higher or at least equal to the sludge obtained from UASB reactors. The activity of the sludge is at least as high as or often higher than the sludge of a UASB reactor. It has been surprisingly found that the qualities of the sludge are dependent on the construction of the reactor and the three-phase separator, which will be explained in more detail hereinbelow.

The improved fluidized bed process may be carried out in an unmodified fluidized-bed reactor, designed for purification processes using biomass attached to carrier, but the process of the invention is advantageously carried out in an improved fluidized-bed reactor, which is described hereinafter in detail. Experiments on full scale have shown that with the unmodified fluidized-bed reactors sub-optimal results are obtained which are related to the construction of the liquid distribution device and the three-phase separator on top of the reactor.

The energy dissipation as a result of the liquid leaving the distribution device (5–10 m/s) is high and to such an extent that granular sludge may be disintegrated by the force of the liquid spouts. The three-phase separator described in European patent application EP-A-90450 functions well during relatively low liquid and gas load conditions, but at high loads (a fraction of) gas will often enter the settling compartment. This will disturb the settling process and result in a loss of overgrown or bare carrier particles, or natural granules.

Furthermore, the present invention provides improvements in relation to the construction of the liquid distribution device, to make the fluidized-bed process more suitable for the use of granular sludge.

Moreover the construction of the 3-phase separator is improved, resulting in a reduced loss of overgrown or bare carrier particles, and in the case of the preferred embodiment of the invention even in a much lesser loss of granular sludge. By doing so a higher concentration of active biomass in the reactor can be maintained, even at high gas and liquid velocities. This improvement will be demonstrated on the basis of a known circular fluidized-bed reactor (1) which is shown in FIG. 1. Assuming a homogeneous distribution of the rising gas bubbles over the reactor cross-section, about 60% of the gas bubbles, formed in the compartment below the throat (2), will be concentrated to form a cylindrical bubble curtain (3). As a result of the sideward movement caused by the deflection of the upward flow of liquid into the settler (4) at the throat, this bubble curtain is not stable. The radial overlap between gas collecting hood (5) and throat (2) is insufficient to lead away all gas bubbles via the hood at any moment. Bubbles entering the settler (4) then disturb the sedimentation process. In reactors with only a relatively low gasflow in the upper part of the reactor this problem plays an insignificant role.

In U.S. Pat. No. 4,609,460 an apparatus is disclosed which collect a considerable portion of the gas developed by fermentation in an UASB reactor, before this reaches the upper part of the react(or. The construction is rather complicated and exists of a lot of collecting systems just above each other throughout the reactor, in connection with one or more downpipes. In such a system the liquid flows are difficult or almost impossible to control, even for UASB-processes. In fluidized-bed systems they cannot be used at all.

In U.S. Pat. No. 4,622,147 an apparatus for a UASB-process is disclosed with consists of three levels of gas-collection hoods. Just as in U.S. Pat. No. 4,609,460 this design is directed to a UASB reactor with low liquid and gas velocities. Not only does this construction not solve the above mentioned problem concerning the bubble curtain which will occur when applied in a fluidized-bed reactor, but this phase separation construction occupies in comparison with the reactor volume a considerable part of the reactor.

Another solution for this problem which would seem to be obvious, is enlarging the overlap between the throat and gas collection hood. However it was found that the liquid velocity increased in the throat of the reactor which made the return of settled biomassparticles out of the settler more difficult. Also the larger diameter will lead to a larger hood, which is more difficult to construct.

Advantageously it was found that the bubble curtain which is concentrated in the throat of the reactor can be separated from the flowing liquid. When the collected gas-bubbles are sent directly to the gascollection space the problem of the bad functioning of the settler is solved, even for extreme high gas and/or liquid velocities in the reactor. This special biogas collection device may be mounted not only in new fluidized-bed reactors, but also existing fluidized-bed reactors may be supplemented with the apparatus of the invention.

Several embodiments of this separate biogas outlet are shown in FIGS. 2, 3, 4 and 5. Partition (6) collects the gasbubbles which without this partition would form the bubble curtain. Via tubes (7) or compartments (7) the collected gas is led directly to the gas collection space (9) or to a collection tube (8) (see FIG. 4) which is connected with the gas collection space. In a commercial full-scale circular reactor the diameter of the partition (6) may be around 0.5–10 meter and for example in case of a diameter of the reactor of 3 meter, the height of this partition may suitably be 30–90 cm. It will be appreciated that all the tubes have to be dimensioned in such a way that they will conduct the gases into the gas collection space and amply above the liquid level in order to prevent the occurrence of an airlift circulation flow in the settler.

The partitions (6) will collect 30–80% of the gas leaving the reactor, more preferably 50–80% of this gas. Although circular reactors are preferred, square, rectangular or other shaped reactors are included in the scope of the present invention. The fluidized bed reactor will conveniently have a height of at least 6 m, preferably at least 10 m. The ratio H/D will conveniently be 2–40, preferably 2–10 (H=height of the reactor, D=diameter or average cross-sectional dimension of the reactor).

Figure 6:
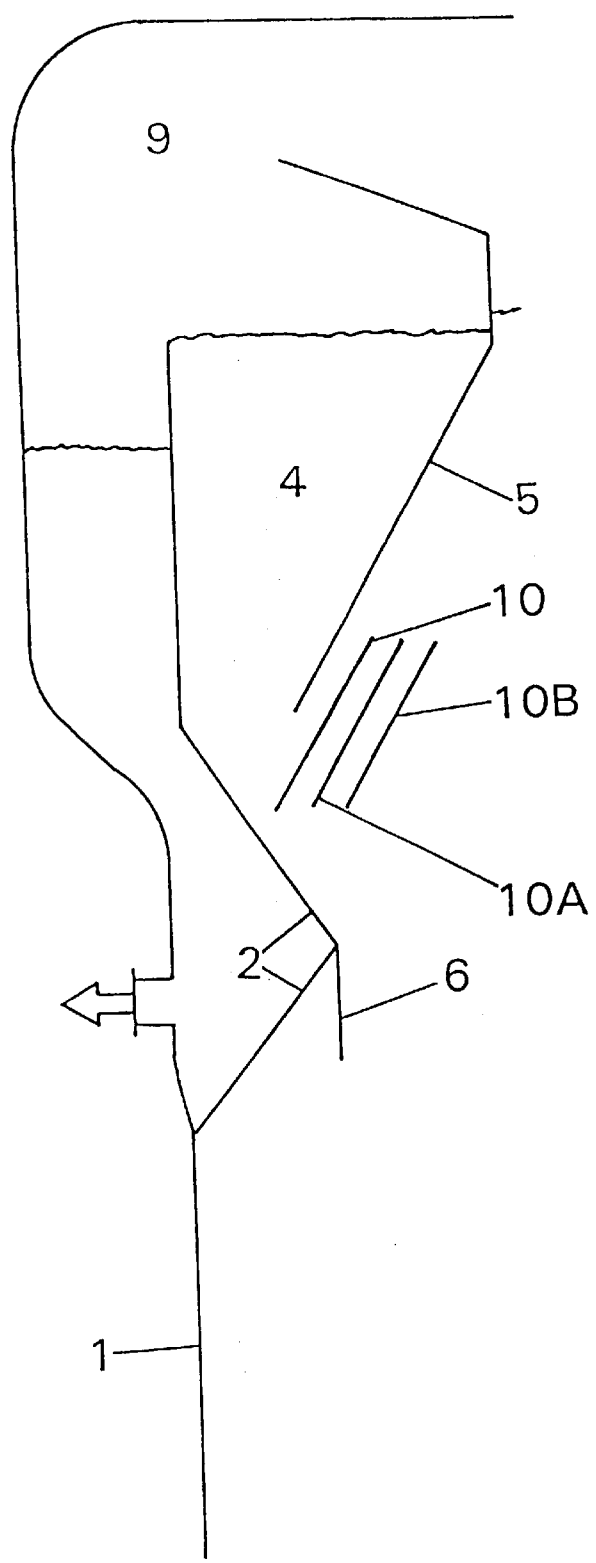
FIG. 6 schematically shows the use of several parallel plates in the three-phase separator.

Furthermore the present invention provides the use of parallel plates in the three-phase separator, which stimulates a better coagulation and growth of small solid particles to larger granules. In FIG. 5 and 6 two embodiments of such constructions are given. In U.S. Pat. No. 4,253,956 a UASB apparatus is shown with interrupted inclined walls of the settler to form such inlet openings. The wall parts thus formed are staggered at the inlet opening to screen them from rising gas so that this gas cannot enter the settling compartment. An outlet opening for the settler at the lower end of the inclined walls makes a return of granules possible. Because of :the high liquid and gas velocities it is surprising that this principle can be used in a fluidized-bed. By bypassing a substantial part of the gas formed in the reaction space it becomes possible to apply such a principle in a fluidized-bed process (in combination with the gas-collection device).

FIG. 5 shows such a partition (10) mounted in the settler. Around this partition a circulation of liquid takes place, which results in a better return of the settled particles from the settler into the reactor and an improved gas/liquid separation around the upper part of this partition (10). This partition may have a conical shape when a circular three phase separator is used.

Moreover rising biogas that will core under this partition, will be collected and will flow upwards, thereby creating an gaslift circulation around this partition because of the difference of the density on both sides of this partition.

In FIG. 6 partitions 10A and 10B are mounted as well which give rise to an even better functioning of the three-phase separator. The number of partitions depends on the volumes of liquid to be treated and technical design dimensions. However it may be economically more attractive to incorporate just one partition (10).

It has been surprisingly found that gaslift circulation contributes to the good and reliable operation of the reactor. In consequence of this circulation all liquid that will leave the settler, will circulate about 5–20 times and pass through upward and downward movements. The mean residence time of the particles in this zone increases and the opportunity of collisions will increase as well.

The small particles (granules) may be grown together by collisions or coagulation and become larger particles. In this way the loss of active biomass is reduced and the speed of the formation of granular, well-settable sludge increases substantially. Therefore it is possible to separate the small active particles, which grow together, from the suspended solids, which are not active in the purification process.

The conversion of smaller sludge particles into granular sludge is improved as a result of the design of the three-phase separator.

It will be appreciated that this makes a fast start-up of the reactor, in comparison with the fluidized-bed system, possible even if only a moderate quantity of inoculation sludge is present.

In case that the cross-section of the 3-phase separator is chosen to be circular, the partitions (5) and (10) are preferably truncated cozies.

The liquid distribution device as described in EP-A-90450 is designed for equal distribution of liquid into a bed of bare carrier-particles (e.g. sand). Due to the rather heavy mass of solids, and the need to prevent sticking together (then forming stagnant zones), the liquid flow rate through the spouts must be high (5–10 m/s) and to such an extent that granular sludge may be desintegrated.

Figure 7A:
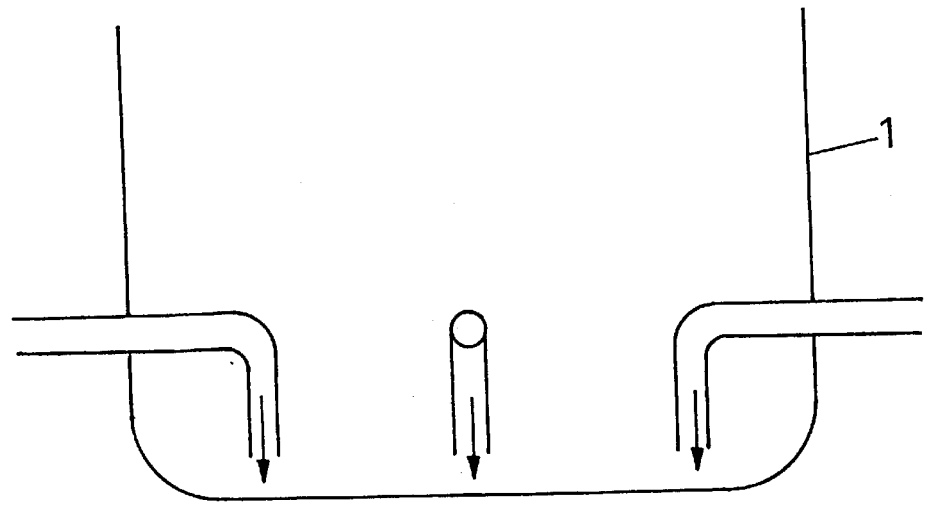
FIG. 7 shows two embodiments of the construction of the liquid distribution device and a horizontal cross-section thereof.
Figure 7B:
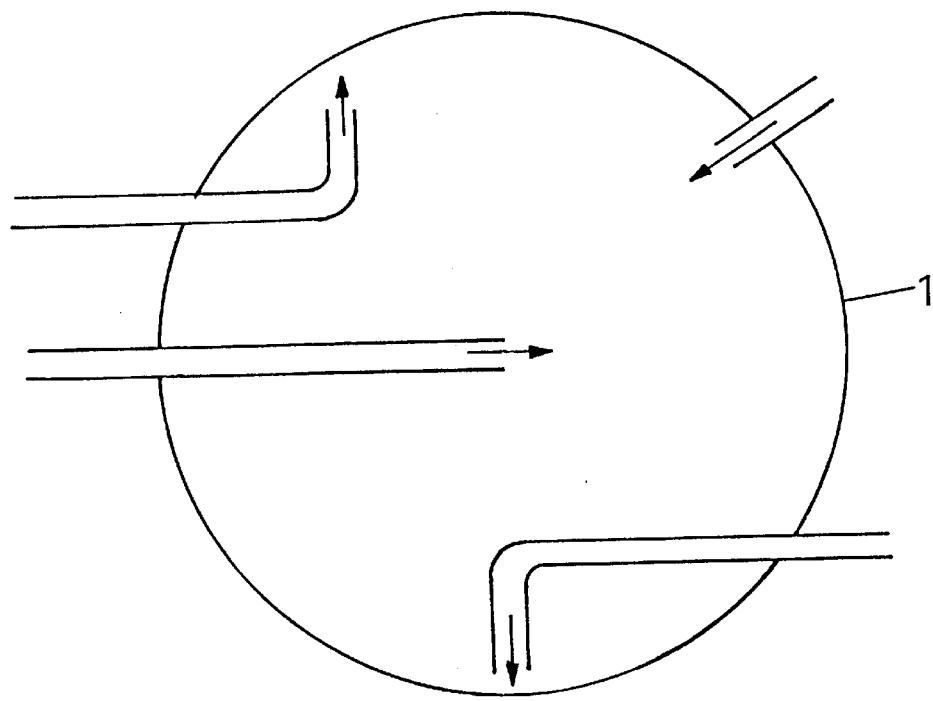

The present invention provides an improvement in relation with the construction of the liquid distribution device, to make the fluidized-bed reactor more suitable for the use of granular sludge (see FIG. 7).

Natural granules have nearly no tendency to stick together when the liquid flow (when being stagnant) is interrupted. Surprisingly even a rather thick layer (several meters) of granular sludge permits a simple and easy start up of the fluidisation process by supplying the liquid at a few points in the lower part of the bed. Mixing, fluidisation and homogenisation of the bed takes place at superficial (upflow) velocities of 6–10 m/h. The active, granular sludge starts gas production directly in the lowest parts of the reactor, which stimulates also the mixing process.

One aspect of the present invention of which some examples are given in FIG. 7 consists of liquid-entrance pipes which are mounted in the reactor at several possible directions. There is no need for special outlet-nozzles that create a high local velocity. Normal outlet-velocity is 0.5–4 m/s, preferably 1–2 m/s. The liquid waste may therefore be fed to the fermentation zone through a plurality of mutually spaced inlets and optionally periodically interrupting or varying the flow of liquid waste through each inlet. For example the liquid waste may be supplied successively through each inlet for a certain period of time. Both rectangular and circular reactors may be used with flat or conical bottoms.

EXAMPLE 1

Figure 8:
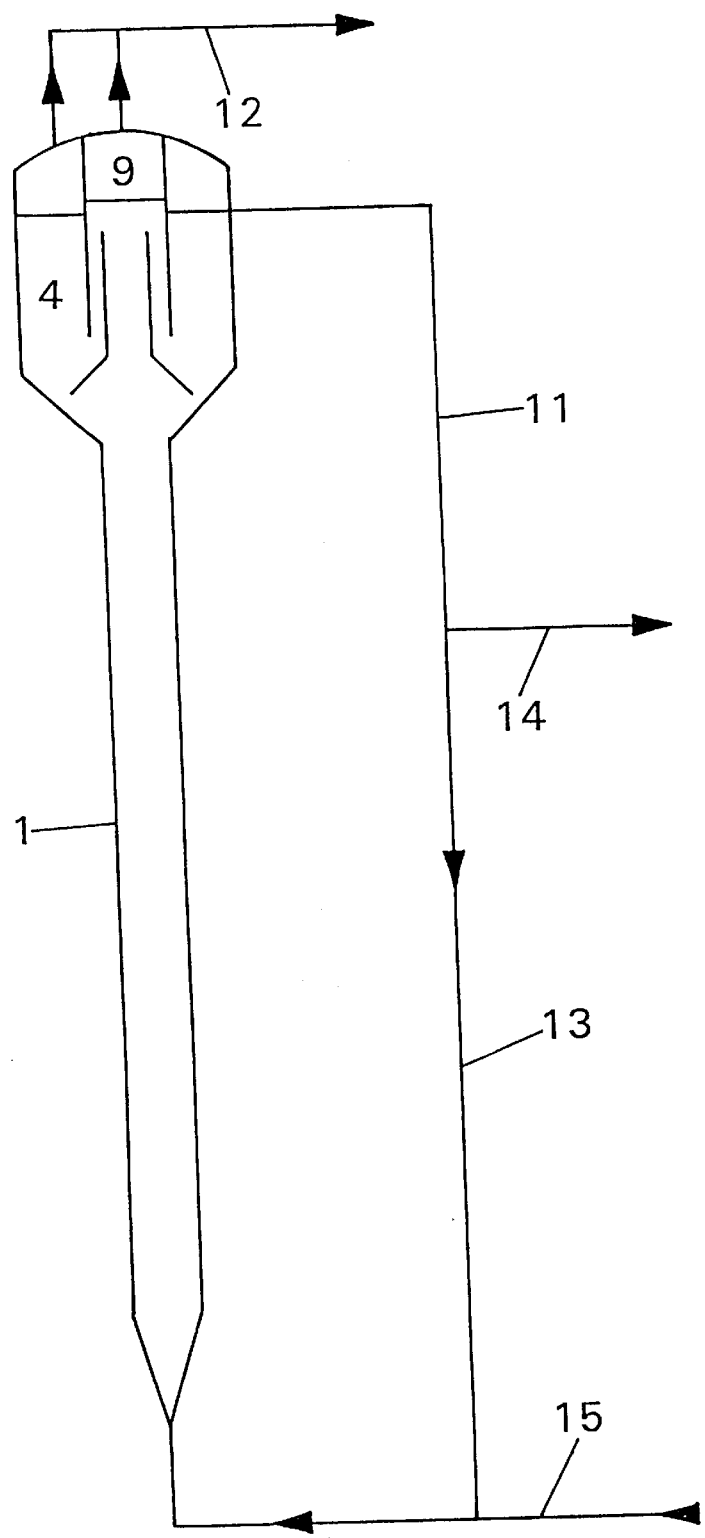
FIG. 8 shows a laboratory fluidized-bed reactor in which sludge granules can be tested.

On top of a laboratory scale fluidized-bed reactor (1) of 4 l and a diameter of 5.0 cm, a three-phase separator with a capacity of 2 l was situated (see FIG. 8).

The fluidized-bed was inoculated with 2 l of biomass granules originating from a UASB reactor, containing 150 g SS (suspended solids) or 120 g VSS (volatile suspended solids).

The superficial liquid velocity in the column was maintained during the experiment at 8.8 m/h.

The liquid leaving the reactor via pipe (11) was partly recirculated (17.0 l/h) via pipe (13), the remaining part was discharged via pipe (14). Raw waste water (15) was introduced (2.1 l/h) together with the recirculated part of the effluent.

The gas formed was collected in chamber (9) and discharged via pipe (12).

A typical waste water containing 2000 mg/l of acetic acid and 480 mg/l of ethanol was purified in the fluidized bed reactor. Nutrients were added to stimulate the biomass growth.

During a period of 3 months including the starting up period, the average load was 36.6 kg $COD/m^3$ reaction volume per day and the conversion-efficiency gave CODt=92.4%. Average production is 45.7 l/d of biogas (CODt=total Chemical Oxygen Demand). The superficial gas velocity is calculated to be 0.97 m/h in the upper part of the reactor.

The mean hydraulic residence time in the reactor was 2 h, the contact time in the active fluidized-bed section was 6 minutes. At the end of the experiment 156 g SS, corresponding to 135 g VSS was present, corresponding to an expanded volume of 2.11 l.

The experiment proved that the sludge granules remain intact, and even show a nett increase of biomass (15 g VSS) under these conditions. The process operates very stably with high efficiency.

EXAMPLE 2

Industrial waste water originating from the chemical and fermentation plants of Gist-brocades, Delft, was purified in a pilot scale process. the waste water was acidified in a continuous flow stirred tank reactor: the hydraulic retention time is 8–12 hours. the effluent of this reactor is fed to a pilot-scale fluidized bed reactor. The influent of the fluidized bed reactor contains 1800–4500 mg/l $COD_t$, 350–500 ng/l sulphates and 0.5–1.0 g/l inert-SS. On an average this influent is acidified for 50%–80%, calculated for fatty acid contribution in the dissolved COD. A cylindrical fluidized bed reactor was used as shown in FIG. 1. The height of the reactor (without the three-phase separator) was 19.45 m, the diameter 0.495 m resulting in a useful volume of 3.7 $m^3$. the smallest cross-section area near the throat (2) was 0.031 $m^2$, the corresponding cross-sectional area of the gas collecting hood at the lowest end was 0.108 $m^2$, the angle of the cover hood part was 55° relative to the vertical.

150 kg DS (dry solids) of granular anaerobic sludge was added to the reactor. The sludge originated from an anaerobic UASB-reactor which was used to purify waste water of a sugar mill. The content of organic material of the sludge was 82%, corresponding at the reactor start up with 120 kg VSS. The sludge granules had an average dimension of 2–3 mm. At the start of the test the height of the expanded granular sludge bed in the reactor was 7.7 m.

The acidified waste water together with the recirculated part of the effluent was introduced at the bottom of the reactor. The pH of the acidified waste water was 6.0–6.7 and the pH of the recirculated liquid was 7.2–7.5.

1.40 $m^3/h$ liquid was introduced into the reactor, corresponding with a superficial liquid velocity of 7.4 m/h. The percentage of acidified waste water of the introduced liquid was increased stepwise; 300 l/h on day 1 till 1000 l/h on day 5 acidified waste water was fed to the reactor. On day 5 the total amount of liquid introduced was increased to 1.80 $m^3/,h$, corresponding with a superficial liquid velocity of 9.5 m/h. The step wise increasing of the load was carried out on the basis of the fatty acid content in the effluent, which was kept less than 100 mg/l.

In Table 2 the quantities of acidified waste water and total quantities waste water are given, and the superficial liquid velocities.

TABLE 2

| day | acidified waste water introduced ($m^3/h$) | recirculated waste water ($m^3/h$) | total liquid introduced ($m^3/h$) | superficial liquid velocity (m/h) | hydraulic residence time (h) |
|---|---|---|---|---|---|
| 1 | 0.3 | 1.1 | 1.4 | 7.4 | 12.3 |
| 5 | 1.0 | 0.8 | 1.8 | 9.5 | 3.7 |
| 3 | 1.3 | 0.5 | 1.8 | 9.5 | 2.9 |
| 26 | 1.5 | 0.65 | 2.15 | 11.4 | 2.5 |
| 34 | 1.7 | 0.75 | 2.45 | 12.9 | 2.2 |

TABLE 2-continued

| day | acidified waste water introduced (m³/h) | recirculated waste water (m³/h) | total liquid introduced (m³/h) | superficial liquid velocity (m/h) | hydraulic residence time (h) |
|---|---|---|---|---|---|
| 39 | 2.1 | 0.35 | 2.45 | 12.9 | 1.75 |
| 43 | 2.5 | 0.4 | 2.9 | 15.3 | 1.48 |

During the test which lasted 50 days the temperature of the reactor was 30°–34° C.

The efficacy of the reactor remained during the period stabile, the efficiency of the removal of fatty acids was all the time ≧, 90%.

During the test the height of the expanded granular sludge bed was frequently measured. At the end of the test the height of the granular sludge bed was 4.6 m. The granules were well-settable and had an average dimension of 2–3 mm. The biogas production flow rate average was 40 m³/day, corresponding with 20 kg COD/m³.day conversion and a superficial gas velocity of 8.5 m/h in the top of the reactor. At peakloads the gasflow rate even was about 14.5 m/h.

Because inoculation sludge originating from an anaerobic UASB-reactor was added, the sludge in the beginning of the experiment consisted in part of small particles which were at least partly washed away. This resulted in a loss of granular sludge at the beginning of the experiment. After this period the amount of granular sludge stabilized.

After the test about 84 kg (total DS) of granular sludge was present with an organic material content of 85% corresponding with about 71 kg VSS. The test demonstrates that most granules remain intact, even at the high biogas and liquid flow rates and, accomodate rapidly to the variable influent-qualities. The granules became a more compact shape during the test; the specific activity of the biomass has a mean value of about 0.8 kg COD/kg. VSS per day (at peak loads=1.6)

EXAMPLE 3

Figure 9A:
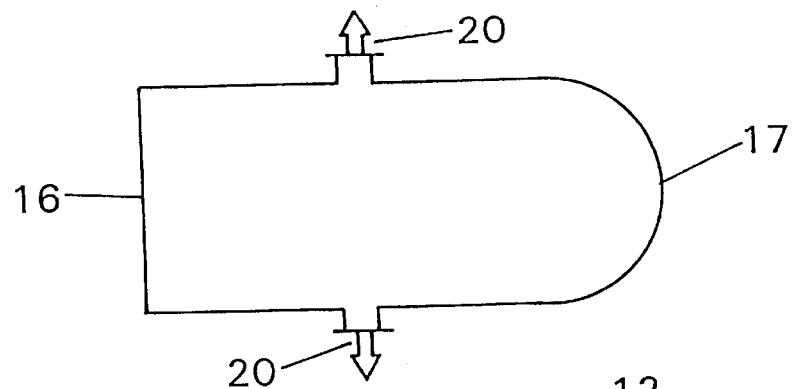
FIG. 9 schematically shows the three-phase separator which is provided with several parallel partitions. This separator is tested on pilot-plant scale.
Figure 9B:
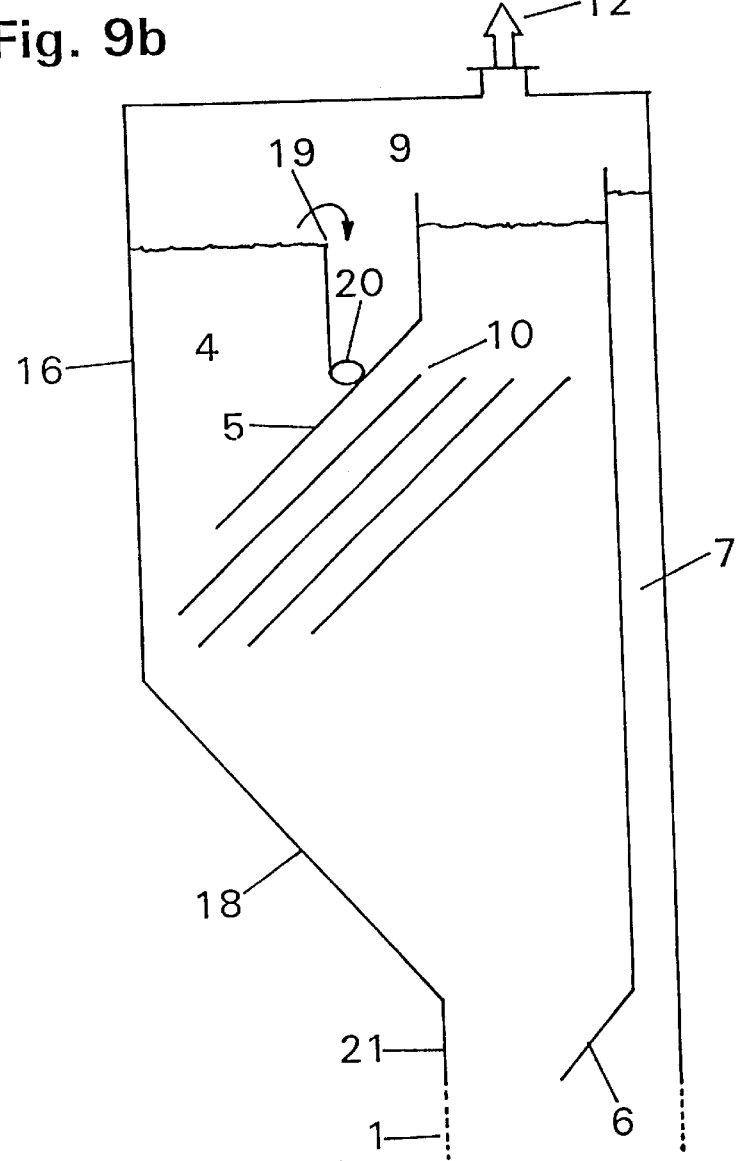

On top of the circular fluidized bed reactor of Example 2 (height 19.45 m and a diameter of 0.495 m) a three-phase separator according to FIG. 9 was mounted. This three-phase separator consists of a rectangular compartment (16) of which one side has a semi-circular form (17). The underside of this compartment is provided with an adaptor (18) which joins a cylinder (21) having a diameter of 0.495 m, which is connected with the reactor. Partition (6) will collect about half of the biogas formed in the reactor, performing the same function as described for the devices (6) in FIGS. 2, 3, 4 and 5. This collected biogas is led through tube (7) directly to the gas collection compartment (9). Beneath the gas collection hood (5), four partitions (10) are mounted.

The total volume of the three-phase separator was about 0.75 m³. After having passed the airlift-circulation-flow the liquid will enter the settling compartment (4). The effluent leaves the reactor, after passing weir (19) (overflow), through outlets (20). The collected gas is removed via outlet (21). In FIG. 9 two liquid outlets (20) are shown.

Waste water originating from Gist-brocades, Delft (see Example 2) was purified in the fluidized bed reactor. Identically to Example 2 this waste water was first acidified. In the beginning of this test the reactor was filled with 84 kg granular anaerobic sludge (=71 kg VSS), which was present at the end of the experiment described in Example 2. In the period of 12 days between the tests of Examples 2 and 3, the sludge was kept in the reactor. This stop did not influence the behaviour or activity of the sludge.

On day 1 500 l/h acidified waste water together with 2.2 m³/h recirculated liquid was introduced into the reactor, corresponding with a superficial liquid velocity of 14 m/h. On the next days the quantity of acidified waste water was increased, meanwhile keeping the total quantity introduced liquid into the reactor constant. Therefore on day 2: 1000 l/h; on day 3: 1500 l/h; on day 4: 2000 l/h; and from day 3: 2500 l/h of acidified waste water was fed. Daring this period of time the biogas production increased from about 8 m³/day till maximal 75 m³/day (peak load). The fatty acids-COD content in the purified waste water was always below 150 mg/l. This clearly demonstrates that the purification was substantially complete. The gross load, calculated on basis of the useful volume of the reactor, varied between 30 and 95 kg COD/m³.day corresponding with a conversion of 12–40 kg COD/m³.day. After 70 days of continuous operation these experiments were stopped; after degassing the amount of granular anaerobic sludge was 103 kg and the amount of granular biomass was estimated to be 88 kg VSS.

The tested 3-phase separator demonstrates a substantially positive influence on the growth of anaerobic (methanogenic) biomass into granules, even at high liquid and biogas-velocities (liquid $V_{sup} \cong 14$ m/h, biogas $V_{max}$ in top of reactor≅16 m/h).

EXAMPLE 4

The circular fluidized bed reactor as used in Example 3 (with three phase separator according to FIG. 9) was used to study sludge growth and granulation.

Waste water originating from Gist-brocades, Delft (see Example 2) was purified in the fluidized bed reactor. Identically to Example 2 this waste water was first acidified (Hydraulic Retention Time=3–4 hours).

Contrary to the other experiments the pilot plant would be started with a rather small amount of granular sludge. An increase in sludge bed height, combined with measurements on amount of biomass (TS, VSS) and amount of sludge particles should prove net sludge growth and formation of new sludge particles (=granulation). Moreover sludge activity tests should prove the presence of active biomass. The reactor was started with 1.5 m sludge bed height (14 kg VSS, 70% VSS, 20 kg TS). The recirculation flow (raw influent + recycled effluent) was 14.4 m³/day during the total experiment, resulting in a superficial upflow velocity of 5 m/h. The raw waste water flow was slightly increased from 200 l/h at the start to 600 l/h after 2 weeks. This did result in a COD loading rate of 60–80 kg COD/day (=16–22 kg COD m³/day). The biogas production varied between 8–14 m³/day resulting in a superficial gas velocity of approximately 2–3m/h. The COD purification efficiency was 55–60%.

After three months the sludge bed height had increased from 1.5 m to 4.3 m. The total amount of sludge increased from 20 kg TS to 49 kg TS, while the amount of organic sludge increased from 14 kg VSS to 40 kg VSS. The sludge activity at the start was 0.9 kg COD/kg VSS. day and 1.2 kg COD/kg VSS.day at the end of the 3 months experiment. Measurements on individual sludge particles showed a 190% increase in the amount of granules.

The results of this experiment show clearly that with the settler device according to the invention granulation and net sludge growth is obtained. Besides it is shown that a sludge with a high content of active biomass is found indicating that non valuable suspended solids are not retained in the reactor.

EXAMPLE 21

This example describes a full-scale 2-step anaerobic treatment of waste water originating from a yeast producing factory. This waste water was a mixture of waste water, distillate of an evaporator and filtrate of the yeast filters.

The average influent contains: 2500–4000 mg/l COD, 300–600 mg/l $SO_4^{2-}$ and 300–600 mg/l suspended solids.

The three fractions were buffered and mixed in two tanks connected in series, each having a volume of 100 m³. The temperature in the buffer tanks was about 37° C. At an average hydraulic residence time of 5–7 h the waste water was partly acidified, about 60–90% of the biodegradable COD was acidified. The two reactors, connected in series, are identical to each other; their three phase separator construction is shown in FIG. 1.

The reactor is described as well in European Patent Application 0090450 (see FIGS. 2, 7 and 8). The height of the reactor is 12.3 m (without three-phase separator), the diameter of the reactor is 3.0 m, the diameter of the three-phase separator is 4.0 m. The useful volume of the reactor is 80 m³. The ratio between the parts of the three-phase separator is substantially the same as the ratios of the corresponding parts of Example 1.

The waste water to be purified was introduced via 5 horizontal distribution pipes, provided with downwardly directed liquid entrance nozzles.

At the beginning of the test in the first reactor (R-1) 5000 kg sand and in the second reactor (R-2) 13500 kg sand was present as carrier material. This carrier material had an average diameter of 0.2–0.4 mm and a bulk density of 2700 kg/m³. The sand was overgrown with biomass which was in principle capable of purifying the waste water. In the first reactor mainly the acidification and in the second reactor mainly the methane-fermentation took place. However due to operational problems, as described before, in the months preceding the test a substantial amount of overgrown sand was washed away, which caused at the same time loss of a considerable quantity of biomass. The operation of the system was therefore unstable, keeping in mind that the initial load of both reactors was 40000 kg sand.

At day 1 the operational conditions were changed in such a way that the formation of the granular sludge according to the invention was stimulated whereby sand was not used as carrier anymore. This has been achieved by taking away the remaining sand stepwise and decreasing the amount of total liquid introduced of 100 m³/h to about 65–70 m³/h, corresponding with the decrease of the superficial liquid velocity of 14 m/h to 9 m/h. The amount of acidified waste water introduced at the beginning of the experiment was 20 m³/h. This quantity was increased to 40 m³/h at day 76. The total amount of liquid introduced into the reactor was maintained constant by decreasing the quantity of recirculated liquid. At day 1 the fatty acid conversion was incomplete although a moderate load was applied: the effluent of the R-1 (first reactor) contained 1900 mg/l and R-2 (second reactor) 600 mg/l (fatty acid efficiency is 67% in R-2). During the test which lasted 7 months, the quantity of granular sludge gradually increased in both reactors. During this whole period the conversion efficiency increased to the maximum fatty acids conversion, and the influent load could be increased till all the waste water was treated. The process showed a stable behaviour and the problems met during the operation with sand as carrier, disappeared by applying the process of the invention.

Table 3 shows the results during the testrun.

TABLE 3

| day | influent flow (m³) | Reactor 1 sand (kg) | Reactor 1 biomass granules (kg VSS) | Reactor 2 sand (kg) | Reactor 2 biomass granules (kg VSS) | load (kg COD/m³) R-2 | R-2 efficiency COD (%) | R-2 efficiency fatty acids (%) |
|---|---|---|---|---|---|---|---|---|
| 1 | 24 | 5000 | 130 | 13500 | 70 | 16.5 | 50 | 67 |
| 41 | 30 | 4000 | 190 | 13000 | 160 | 14.5 | 74 | 78 |
| 76 | 40 | | 360 | | 830 | 18.5 | 62 | 80 |
| 127 | 40 | 1000 | 1370 | 8000 | 730 | 17 | 62 | 79 |
| 132 | 41 | 200 | 1500 | 4000 | 1500 | 20 | 65 | 82 |
| 200 | 41 | 200 | 2000 | 4000 | 2000 | 20 | 65 | 32 |

*kg VSS = kg volatile suspended solids.
The biomass quantity is calculated on basis of 4 samples taken at different heights from the cylindrical reactor.

The activity of the granular sludge, measured under substrate saturated conditions is shown in Table 4.

TABLE 4

| day | activity of the granular sludge in R-1 (kg COD/ kg VSS · day) | activity of the granular sludge in R-2 (kg COD/ kg VSS · day) | activity of granular sludge washed out with the effluent (kg COD/kg VSS · day) |
|---|---|---|---|
| 73 | 0.8 | 1.98 | 2.25 |
| 185 | 0.85 | 1.63 | 1.42 |

The activity of the granules originating from reactor 1 is lower than those from reactor 2 because in reactor 1 acidification as well as methane-forming bacteria are present. The activity of the granular sludge of reactor 2 is high compared to usual values in anaerobic systems (such as USAB-reactors) of 0.4–0.3 kg COD/kg VSS.day. Due to the imperfect three-phase separator part of the sludge is washed out with the effluent. The granules washed out, appeared to be very active as well. The terminal falling (settling) velocity of sludge granules taken at day 155 from reactor 1 at a sample point 1 m above the liquid distribution system was 39 m/h, at a sample point 3.9 m above the liquid distribution system was 30 m/h and at a sample point 7.3 m above the liquid distribution system was 27 m/h.

For reactor 2 the terminal falling velocity of the granules was 32 m/h at a height of 1.0 m and 29 m/h at a height of 3.9 m above the liquid distribution system.

As demonstrated above it is possible to obtain granular sludge without an inoculation of similar sludge material in fluidized bed reactors wherein the carrier material (such as sand) has virtually disappeared.

The upward superficial liquid velocity was 8–10 m/h, the superficial biogas velocity in the upper part of the reactors was 2–5 m/h (R-1) and 3–8 m/h (R-2), respectively. Although the reactors were not supplied with the above described improvements viz, the gas collection partitions (6) or partition (10) or the simplified influent pipes, granular sludge was formed, which was able to purify the waste water.

The result is notable in view of the industrial circumstances of the factory viz. the continually changing liquid and COD-load, for example in the weekend hardly any waste water was supplied to the system.

EXAMPLE 6

The special gas collection device, as described before on the basis of FIG. 4 was installed in two fullscale reactors with circular diameter of 5 m and diameter of hood of 6.5 m; grossvolume is 380 m$^3$, and nett volume of the reactors is 240 m$^3$. The reactors operated in series, i.e. the feed liquid was introduced in Reactor 1 in which mainly acidification and sulphate reduction processes take place, thereafter the "acidified" liquid was introduced into Reactor 2 in which mainly methanisation processes take place. The special gas collection device collected about 70% of the gas formed, which gas did not enter the three-phase separator.

Parallel with the two mentioned reactors, two other reactors operated with exactly the same influent composition, same biological processes and identical technical dimensions of the reactors and identical operational conditions. In the second set of reactors however these special gas collection devices were not installed. All (4) reactors operated on the biomass-on-carrier principle, using sand (0.2–0.4 mm) as carrier. A period of over 500 days in which the two sets were operated without main interruptions demonstrated clearly the positive effect of the gas collection device. Without this device the loss of overgrown particles with a terminal falling velocity of 60 m/h starts already at liquid superficial velocity of 10 m/h and amounts then up to about 50 kg/day. At a superficial velocity of 16 m/h the loss increases to 200 kg/day and more. With the special gas collection device the loss of identical particles is virtually nil even at a superficial velocity of 16 m/h.

We claim:

1. A three-phase separator for a fluidized bed apparatus for the anaerobic treatment of a waste water liquid phase wherein a gas phase is generated, the three-phase separator being adapted to be situated in the top of a reactor for separating the gas phase from a treated liquid phase, and from a biomass, and for returning the biomass to the reactor, the three-phase separator comprising:

a settling compartment having an inlet, and outlet for treated liquid phase from which the gas phase and biomass have been substantially removed, a plurality of parallel partitions connected to the settling compartment and inclined to both the vertical and the horizontal for creating an internal gaslift circulation of biomass and treated liquid phase in the separator, the parallel partitions having an inlet for the biomass and treated liquid phase that is separated from the gas phase and flows between the partitions to an outlet from said parallel partitions, the parallel partitions inlet being above the parallel partitions outlet, and the outlet from the parallel partitions being in open communication with the inlet to the settling compartment for the flow of treated liquid phase into the settling compartment, a deflector inclined to the vertical and the horizontal, said deflector being connected to the settling compartment and having a major surface extending below and across the inlet to the settling compartment and below and across the outlet from the parallel partitions to provide an outlet from the separator for return of the biomass from the separator to the reactor, the outlet for the biomass being spaced apart from the inlet to the parallel partitions, the inclined deflector and the parallel partitions being at opposite inclined angles with respect to each other, whereby treated liquid phase flowing into the settling compartment and biomass is separated from the treated liquid phase and flows back to the reactor with the aid of the gaslift circulation.

2. The three-phase separator of claim 1 wherein the parallel partitions are oriented at an angle to the inclined deflector.

* * * * *